Aug. 25, 1970
R. P. VINCENT
3,525,187
EXPLOSIVELY DRIVEN SUBMARINE ANCHOR
Filed Nov. 5, 1968
3 Sheets-Sheet 1
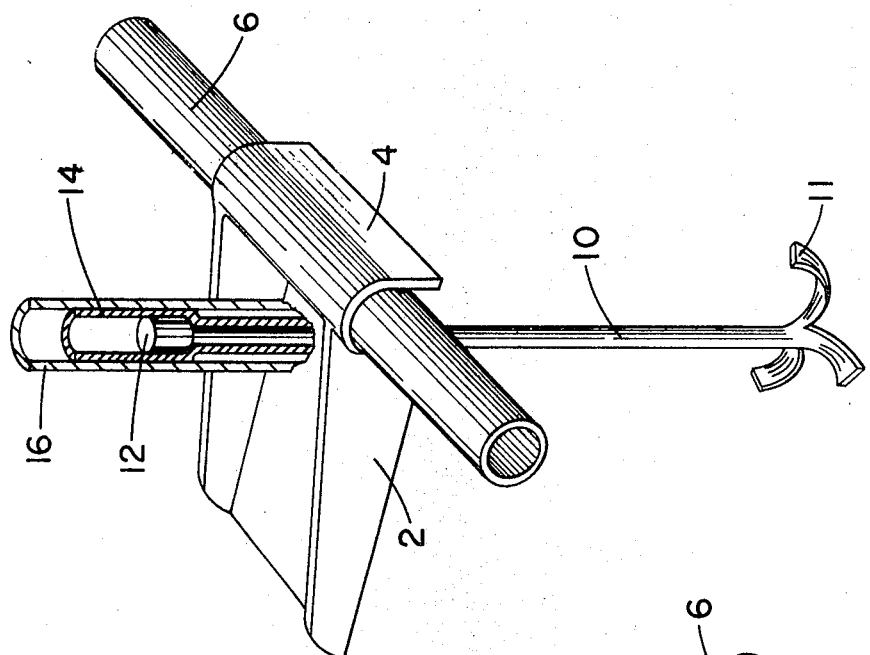
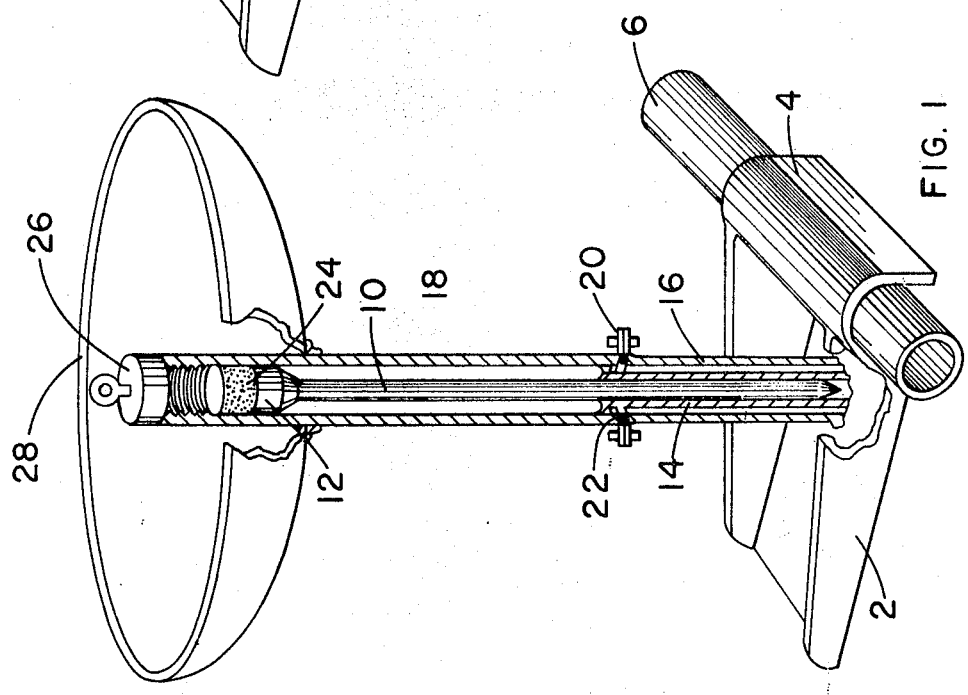
INVENTOR.
RENIC P. VINCENT
BY
ATTORNEY

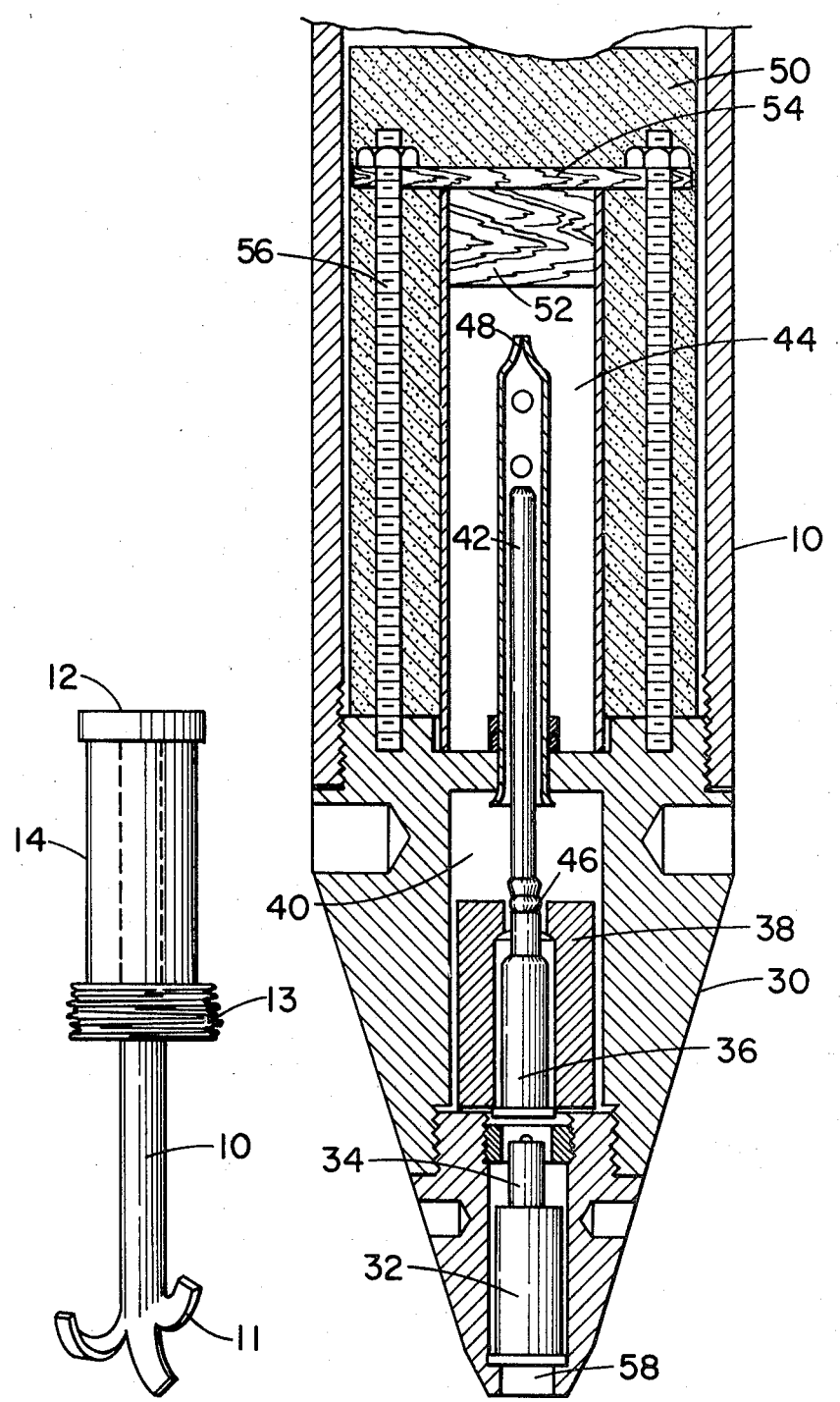

United States Patent Office 3,525,187
Patented Aug. 25, 1970

3,525,187
EXPLOSIVELY DRIVEN SUBMARINE ANCHOR
Renic P. Vincent, Tulsa, Okla., assignor to Pan American Petroleum Corporation, Tulsa, Okla., a corporation of Delaware
Continuation-in-part of application Ser. No. 660,526, Aug. 14, 1967. This application Nov. 5, 1968, Ser. No. 777,980
Int. Cl. E02d 5/80; B63b 21/28
U.S. Cl. 52—155                                                10 Claims

ABSTRACT OF THE DISCLOSURE

An explosively driven submarine anchor assembly suitable for securing pipelines to the ocean floor comprises an explosively driven nail surrounded by a tubular member having a deceleration means therewithin to prevent the nail from passing entirely through the assembly and into the ocean floor. Affixed to the tubular member is a clamping means suitable for securing a pipeline to the anchor body. Means may also be used in the base of the aforesaid tubular member for preventing upward movement of the nail after it has been driven. The gun barrel used in firing the nail is retrievable and may be reused.

---

This is a continuation-in-part of my copending application U.S. Ser. No. 660,526 filed Aug. 14, 1967, now abandoned.

The present invention relates to explosively driven anchors suitable for securing a pipeline or similar conduit to the bottom of a river, inlet or other bodies of marine or fresh water where a substantial current is present. More particularly it is concerned with a novel anchor capable of preventing both lateral and vertical movement of a submerged pipeline comprising a clamp adapted to fit over said pipeline and held in place on the ocean floor, for example, by means of an elongated fastener running through said clamp.

BACKGROUND

Pipelines located at the bottom of bodies of water having a substantial current, e.g., 5 to 10 knots per hour, if not properly anchored or weighted, can fail owing to fatigue caused by movement of the line. This condition is particularly severe in areas such as Cook Inlet, Alaska, where operators are faced with 30 ft. tides which change every six hours, and reversing tidal currents of 5 to 8 knots per hour. The forces generated under these conditions not only cause a reversing lateral movement of the pipeline but in some cases—particularly where a section of the line spans a gorge or hollow—the line tends to flutter or vibrate. This eventually results in fatigue and rupture of the pipeline. A number of solutions have been proposed in an effort to overcome these problems. However, none of them have met with unqualified success. For example, it has been suggested that the line be weighted with a cement sheath to insure against movement by currents but the problems of laying such a weighted line are formidable, particularly where it is desired to lay the line in deep water. In such cases the stresses developed are sometimes sufficiently severe to fracture the cement sheath. Even if the line is placed on bottom without damage to the outer cement layer the magnitude of the currents often is sufficiently great to cause pipeline flutter and the problems typically resulting therefrom. To prevent flutter in such line "spoilers" an inch or so in height going in a helical pattern around the pipe have been used. However, the advantages of such measures have not been established.

German Pat. No. 225,013 granted Aug. 20, 1908 discloses a projectile type anchor that is fired into the ocean floor. This particular device has an anchor means affixed to a spiralled shaft and at the uppermost end of the shaft is a head slightly smaller in diameter than the internal diameter of the cylindrical barrel from which the anchor is fired. To prevent the anchor body from being entirely buried into the ground underlying the body of water, a stop is located at about the muzzle of the gun barrel so that when the anchor body is fired through the barrel it is prevented from burying itself by the head striking the stop. In the past, I have tried this means of preventing such a projectile from leaving the gun barrel when fired and have found that if the anchor is fired in a relatively soft soil, a charge suitable for driving the anchor into a harder or more dense soil, will drive the projectile at such a high velocity that when it strikes the stop, the head separates from the shaft. Such means of attempting to restrain a portion of the projectile within the barrel also subjects the gun itself to abnormally severe operating conditions.

BRIEF DESCRIPTION OF THE INVENTION

I have now developed an explosively driven anchor adapted to secure pipelines and similar conduits to the bottom of bodies of water having objectionable currents therein. This anchor comprises a clamp affixed to and extending transversely of the pipeline and having at its opposed lateral extremity an elongated fastener capable of being secured to the ocean floor or similar location. The fastener portion includes a base having an upright deceleration tube or sleeve of a deformable material. Secured also to the fastener portion is a concentric outer upwardly extending barrel having a closed upper extremity and provided with an internal sliding piston. Integral with and extending downwardly from the piston is a cylindrical projectile body having its forward end slidably received into the deceleration tube. On top of the piston there is placed a powder charge suitable for generating, for example, from 100,000 to about 500,000 ft. pounds of energy. The charge may be enclosed in a casing of the kind used in field artillery guns. At the lower end of the projectile may be placed a flaring charge to assist in securing the projectile once it has penetrated the ground. The use of such a charge, however, is not essential to the operability of my invention and the desirability thereof will vary with the nature of the ocean floor or similar base into which the anchor is to be placed. A concave plate is secured to the upper portion of the barrel and functions to provide additional reaction force to the barrel when the gun is fired. The barrel and reaction plate affixed thereto are retrievable and reuseable. The barrel itself may be fired for as many of 50 or more times before it needs to be replaced.

In operation a powder charge is detonated within the breech of the gun barrel forcing the projectile downwardly into the ocean floor. As the projectile approaches the bottom of the gun barrel the piston contacts the upper end of the deceleration tube which expands as the piston travels downwardly through it, decelerating the projectile to rest. In this connection the terms "decelerating" and "decelerate" appearing in the present description and claims when referring to the structure employed to slow down or restrain the projectile within the gun barrel, after it has traveled a predetermined distance, are intended to mean that the stopping distance is several inches rather than a few ten thousandths of an inch as would be the case when using a stopping mechanism such as disclosed in the above mentioned German patent. It is not intended that said terms be construed as meaning an abrupt stop.

If a flare charge is placed in the nose of the projectile it may be set to fire by means of a suitable delay mechanism. The lower extremities of the projectile expand laterally to assist in preventing withdrawal thereof.

BRIEF DESCRIPTION OF THE DRAWINGS

My invention may be further illustrated by reference to the accompanying drawings wherein FIG. 1 shows my novel anchor assembly before firing and affixed to a section of pipeline.

FIG. 2 shows the assembly illustrated in FIG. 1 after firing has taken place and with the lower end of the gun barrel affixed to the base plate.

FIG. 3 illustrates an alternate type of deceleration tube which breaks the force of the projectile by crushing rather than by expansion.

Figure 4:
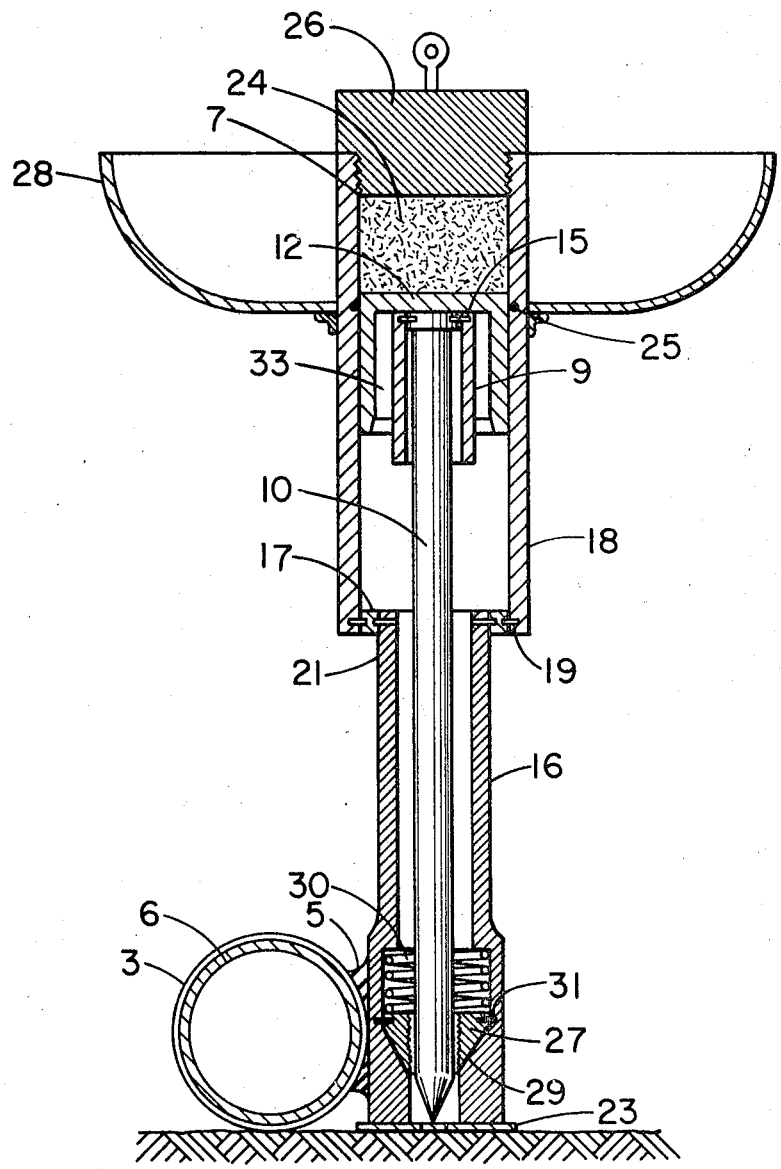
FIG. 4 is still another anchor assembly employing a dashpot type deceleration mechanism along with the special means near the muzzle of the gun barrel for holding the projectile securely once it has been fired.

Referring again to FIG. 1, the anchor assembly includes a base plate 2 having a clamp 4 integrally joined thereto and adapted to fit snugly over a section of pipeline 6. Plate 2 is secured to the sea floor by means of nail 10 having a tapered head 12 cemented thereto and adapted to slide into deceleration tube 14 expanding it against the lower portion of barrel 16 which preferably is an integral part of base plate 2. Lower section 16 of the gun barrel is affixed to thicker upper portion 18 thereof by means of lug bolts 20 and a water tight seal formed by means of O-ring 22 where the two sections of the gun barrel join. O-ring 22 as well as a shear plate (not shown) in the lower extremity of section 16 serve to prevent water from entering the barrel and contacting propellant charge 24. The gun is preferably electrically fired by means of a firing wire which may be inserted through threaded breech plug 26. Welded to gun barrel section 18 is a concave reaction plate 28 which serves to provide additional reaction force to the barrel when the gun is fired. The reuseable portion of the gun barrel (18) is about 4 ft. long and has an I.D. of 3.46 inches. Base plug 26 is secured into the barrel by means of tapered threads similar to those used in the breech mechanism of large caliber guns.

Steel projectile or nail 10 may be constructed of hollow seamless tubing 2.5 inches in diameter, approximately 10 ft. long and may have therein just above the nose thereof a flare charge shown in detail in FIG. 5. This charge, which is detonated after the nail is embedded into the soil, serves to lock the nail in place by splitting the nose into three segments as shown, for example, in FIG. 2.

Deceleration tube 14 may be corrugated and is preferably in two sections, the first of which consists of seamless steel tubing 24 inches in length and 3½ inches O.D. by a ⅛ inch wall. This portion is placed immediately above a second section 12 inches long and having a ¼ inch wall. Such arrangement permits nail 10 to travel downwardly through the gun barrel at a decelerating rate but still at a reasonable velocity without coming to an abrupt stop. The lower thicker wall section of tube 14 serves to insure the nail from passing on through base plate 2. Thus, in effect, the wall thickness of deceleration tube 14 is tapered so as to match that of tapered head or piston 12. When tapered head 12 enters the bottom 12 inch section of tube 14, nail 10 decelerates rapidly and with a 60 to 100 gram propellant charge is easily retained within the anchor assembly. Alternatively, the deceleration tube may be of the design shown in FIG. 3 which employs a thin walled, e.g., .02 to .03 inch in thickness, steel tube approximately 8 ft. long and fitting around nail 10. The lower end of tube 14 is welded to base plate 2. This tube serves a number of purposes, one of which is to provide a mounting bracket or support for the explosively set anchor. Another function is that of an energy absorbing device which allows the anchor to be used where the bottom is of unknown hardness. The deceleration tube is somewhat shorter than the projectile, therefore the projectile can attain its full velocity and energy before the head thereof contacts the top of the deceleration tube. If the penetration is minimum due to the hardness of the bottom, very little of the tube will fail. Thus most of the 100,000 to 500,000 ft. pounds of energy will be used in driving the projectile into the bottom. The top of the tube collapses by a failure mechanism which produces bellows-like convolutions 13 such as shown in FIG. 3. The tube performs a third function in that it provides a spacer tube of the correct length between head 12 of the projectile and clamp 4, securing section of pipeline 6. Should the bottom be very soft the deceleration tube can be designed to absorb all of the energy in the projectile thus protecting the pipeline from damage which might result from the higher velocity projectile reaching the end of its stroke.

In FIG. 4 the anchor assembly and associated equipment includes an annular member 3 which may be continuous or bolted together around the section of pipeline 6. Member 3 is welded at 5 to a hollow cylindrical support member 16 holding nail 10 which has just below head 12 a tubular weight 9 extending downwardly a short distance, e.g., about 1 foot, from the lower portion of nail head 12 and is secured to nail 10 either by shear pins 15 or by a light press fit. A firing chamber 7 is formed by the upper end of gun barrel 16 and the walls thereof in combination with nail head 12. O-ring 25 serves to maintain a tight seal between the sides of head 12 and the walls of the gun barrel. At the lower end of muzzle of barrel 18 a ring 17 is inserted and held in place by shear pins 19. In turn, support member 16, which is in effect an extension of gun barrel 18, is affixed to said barrel by means of shear pins 21. At the lower extremity of hollow member 16 is a shear plate 23 which prevents the entry of water into the interior of the anchor assembly prior to firing. Immediately above plate 23 are slips 27 resting on tapered shoulders 29 of cylindrical member 16 and held in place by shear pins 31. Resting on slips 27 is a compressed coil spring 30.

In firing the nail, the downward thrust of head 12 causes pins 21 to shear thereby disengaging ring 17 from the upper end of cylindrical member 77. Downward progress of nail 10 is impeded by the soil; however, the penetration may vary from one location to another. If the soil is hard, penetration is limited, but the holding power is proportional to the energy of the charge propelling the nail downward. The dashpot action of annulus 33, which may be filled with grease or similar material, closing over the upper extremity of member 16 brings the nail to rest without damage, particularly where the soil is soft. If desired, the assembly could be employed without the use of shear plate 23 thereby allowing water to fill annulus 33 whereby a similar braking action is generated on firing nail 10. When nail 10 begins to decelerate rapidly and finally comes to rest, tubular weight 9 frees itself from the base of nail head 12 and as a result of the momentum caused by downward movement of nail 10, travels at a high rate of speed, striking slips 27 with a force sufficient to shear pins 31 forcing the slips downwardly with the aid of coiled spring 30 to engage nail 10, and hold it stationary with respect to cylindrical member 16.

The flare charge used to form flukes 11, as shown in FIGS. 2 and 3, may be any of those now well known to the art as shown, for example, in U.S. 3,222,842 issued Dec. 14, 1965 to V. W. Luedloff et al., and U.S. 3,233,415 issued Feb. 8, 1966 to H. E. Thomas.

The anchor assembly of my invention was subjected to a series of tests at water depths ranging from about 15 to 25 ft. In the first test the lake bottom appeared to be light silt on the top with a more compacted silt and clay down approximately 3 or 4 ft. The first shot penetrated the formation for a distance of 5½ ft. with the flare charge detonating approximately 2 seconds after the main propellant charge had fired. The force required to move the base plate was 3200 pounds. A previous test in the same location with no flare charge being used in the nail required approximately the same force to remove it.

The next test was carried out in 25 ft. of water where the lake bottom was a clay type of formation having a layer of silt approximately 30 inches deep. Beneath this silt layer the clay formation was hard. On firing the nail into the formation a penetration of about 5 feet was attained. The flukes produced by the detonation of the flare charge were not driven out as far into the formation as was observed in the first case. The pull out force required was found to be 7000 pounds.

It will be apparent to those familiar with this art that while the foregoing description deals in detail with a specific form of anchor assembly it will be recognized that the principle of my invention may be employed in a variety of anchor designs wherein it is desired to secure such anchor to the floor of a body of water by explosive means.

I claim:

1. An anchor assembly adapted for use on the floor of a body of water having in combination
   a gun barrel with a closed upper extremity and provided with an internal sliding piston,
   a cylindrical projectile body integral with said piston,
   means for driving said projectile from said barrel at a high velocity, and
   mechanical means within said barrel for permitting said projectile body to travel downwardly in said barrel at a decelerating rate other than an abrupt stop when said body has protruded from said barrel a predetermined distance.

2. The anchor assembly of claim 1 wherein means is provided at the lower extremity of and within said barrel to prevent upward movement of said projectile body relative to said barrel after having been driven into said floor.

3. The anchor assembly of claim 1 in which said deceleration means is a deformable tube positioned within said barrel and adapted to decelerate said projectile body when the latter has protruded a predetermined distance from the lower extremity of said barrel.

4. The anchor assembly of claim 1 wherein said barrel is in two sections the lower one of which is detachably mounted to the upper section of said barrel which is reuseable.

5. An anchor assembly adapted for use on the floor of a body of water having in combination
   a generally flat base portion with means for holding a conduit to said floor,
   a gun barrel secured to said base portion and extending upwardly therefrom, said barrel having a closed upper extremity and provided with an internal sliding piston,
   a cylindrical projectile body integral with and extending downwardly from said piston,
   means for driving said projectile from said barrel,
   mechanical means within said barrel for permitting said projectile body to travel downwardly in said barrel at a decelerating rate other than an abrupt stop when said body has protruded a predetermined distance from the lower extremity of said barrel, and
   an upwardly concave reaction plate secured to said barrel to provide additional reaction force to said barrel when said projectile body is driven into said floor.

6. The anchor assembly of claim 5 wherein said deceleration means is a deformable tube within said barrel affixed to and extending upwardly from said base portion, the forward extremity of said body being slidably receivable in said deceleration tube, said piston having a diameter such that it engages said tube when said body is driven into said floor.

7. The anchor assembly of claim 3 wherein the diameter of said piston is such that it rests on top of said deceleration tube causing the latter to collapse by a failure mechanism which produces bellows-like convolutions in said tube when said body is driven into said floor.

8. The anchor assembly of claim 3 wherein said piston is tapered so that when said body is driven into said floor the walls of said deceleration tube are expanded outwardly by said piston whereby a tight fit between said tube and said barrel is secured.

9. The anchor assembly of claim 5 wherein said barrel is in two sections, the lower one of which is detachably mounted to the upper section of said barrel and remains in said base portion when said body is driven into said floor, said upper section being reuseable.

10. The anchor assembly of claim 8 wherein the wall thickness of said deceleration tube is tapered so as to match the taper of said piston.

References Cited

UNITED STATES PATENTS

| 2,468,729 | 5/1949 | Black | 52—155 |
| 3,170,433 | 2/1965 | Gardiner. | |
| 3,222,842 | 12/1965 | Luedloff et al. | 52—155 X |
| 3,233,415 | 2/1966 | Thomas | 52—155 |

FOREIGN PATENTS

| 225,013 | 8/1910 | Germany. |

ALFRED C. PERHAM, Primary Examiner

U.S. Cl. X.R.

114—206

UNITED STATES PATENT OFFICE
CERTIFICATE OF CORRECTION

Patent No. 3,525,187    Dated August 25, 1970

Inventor(s) Renic P. Vincent

It is certified that error appears in the above-identified patent and that said Letters Patent are hereby corrected as shown below:

Column 4, line 28, "of", first occurrence, should read -- or --; line 40, "77" should read -- 7 --.
In the drawings, FIG. 5 should be deleted.

Signed and sealed this 3rd day of November 1970.

(SEAL)
Attest:

EDWARD M. FLETCHER, JR.
Attesting Officer

WILLIAM E. SCHUYLER, JR.
Commissioner of Patents